(12) United States Patent
Webster et al.

(10) Patent No.: US 12,293,375 B2
(45) Date of Patent: May 6, 2025

(54) TECHNOLOGIES FOR USING MACHINE LEARNING TO DETERMINE PRODUCT CERTIFICATION ELIGIBILITY

(71) Applicant: UL LLC, Northbrook, IL (US)

(72) Inventors: Scot Webster, Northbrook, IL (US); Mahmood Tabaddor, Rochester, MI (US); John C. Jones, Gilberts, IL (US); Mario Xerri, Melville, NY (US)

(73) Assignee: UL LLC, Northbrook, IL (US)

( * ) Notice: Subject to any disclaimer, the term of this patent is extended or adjusted under 35 U.S.C. 154(b) by 669 days.

(21) Appl. No.: 17/084,701

(22) Filed: Oct. 30, 2020

(65) Prior Publication Data
US 2021/0142334 A1  May 13, 2021

Related U.S. Application Data

(60) Provisional application No. 62/933,175, filed on Nov. 8, 2019.

(51) Int. Cl.
*G06Q 30/018* (2023.01)
*G06N 20/00* (2019.01)

(52) U.S. Cl.
CPC .......... *G06Q 30/018* (2013.01); *G06N 20/00* (2019.01)

(58) Field of Classification Search
CPC ......... G06Q 30/0207–30/0277; G06Q 30/018; G06N 20/00; G06F 18/214
USPC ........................................................... 705/14
See application file for complete search history.

(56) References Cited

U.S. PATENT DOCUMENTS

| | | | |
|---|---|---|---|
| 9,262,686 B1* | 2/2016 | Singer | G06V 30/268 |
| 10,088,983 B1* | 10/2018 | Qaddoura | H04N 21/23439 |
| 10,515,372 B1* | 12/2019 | Jordan | H04L 12/2818 |
| 11,507,876 B1* | 11/2022 | Kuo | G06N 20/00 |
| 2009/0240735 A1* | 9/2009 | Grandhi | G06Q 30/02 |

(Continued)

FOREIGN PATENT DOCUMENTS

| | | |
|---|---|---|
| CN | 204255891 U | 4/2015 |
| CN | 105301173 A | 2/2016 |

(Continued)

OTHER PUBLICATIONS

Applying machine learning techniques to determine product risks (Year: 2019).*

(Continued)

*Primary Examiner* — Gautam Ubale
(74) *Attorney, Agent, or Firm* — MARSHALL, GERSTEIN & BORUN LLP

(57) ABSTRACT

Systems and methods for using machine learning to assess eligibility for product certification are disclosed. According to certain aspects, a server computer may train a set of machine learning models using a set of training data, where the set of machine learning models may be specific to products and certifications for the products. The server computer may access product specifications associated with a set of products sought to be certified, and may analyze the product specifications using the an appropriate machine learning model(s), the output of which may indicate whether the set of products is eligible for certification, the set of products is ineligible for certification, or the product specifications need further review.

5 Claims, 4 Drawing Sheets

(56) References Cited

U.S. PATENT DOCUMENTS

| | | | | |
|---|---|---|---|---|
| 2010/0145678 | A1* | 6/2010 | Csomai | G06F 40/169 |
| | | | | 704/10 |
| 2014/0019456 | A1 | 1/2014 | Li et al. | |
| 2014/0172652 | A1* | 6/2014 | Pobbathi | G06Q 10/087 |
| | | | | 705/28 |
| 2014/0297570 | A1* | 10/2014 | Garera | G06Q 50/01 |
| | | | | 706/12 |
| 2015/0286630 | A1* | 10/2015 | Bateman | G06V 30/413 |
| | | | | 704/9 |
| 2016/0321582 | A1* | 11/2016 | Broudou | G06N 20/00 |
| 2017/0116179 | A1* | 4/2017 | Gagné-Langevin | |
| | | | | G06F 40/106 |
| 2017/0185653 | A1* | 6/2017 | Huang | G06F 16/2468 |
| 2017/0193349 | A1* | 7/2017 | Jothilingam | G06N 20/20 |
| 2017/0344515 | A1* | 11/2017 | Gevka | G06F 40/143 |
| 2018/0211302 | A1* | 7/2018 | Krishnan | G06N 20/00 |
| 2018/0318746 | A1* | 11/2018 | Thomas | F24F 11/39 |
| 2018/0330455 | A1* | 11/2018 | Bayyapu | G06Q 50/18 |
| 2020/0067861 | A1* | 2/2020 | Leddy | G06F 21/6245 |
| 2020/0142999 | A1* | 5/2020 | Pedersen | G06F 16/35 |
| 2020/0167794 | A1* | 5/2020 | Mathews | G06Q 20/206 |
| 2020/0298925 | A1* | 9/2020 | Viner | A42B 3/0466 |
| 2020/0311688 | A1* | 10/2020 | Lipman | G06F 16/1774 |
| 2020/0349584 | A1* | 11/2020 | Cooney | G06Q 30/018 |
| 2020/0364727 | A1* | 11/2020 | Scott-Green | G06Q 50/01 |
| 2021/0042736 | A1* | 2/2021 | Kursun | G06Q 20/306 |
| 2021/0073583 | A1* | 3/2021 | Dagan | G06F 18/2178 |
| 2021/0081900 | A1* | 3/2021 | Wang | G06N 5/04 |
| 2021/0117621 | A1* | 4/2021 | Sharpe | G06F 16/35 |
| 2021/0124919 | A1* | 4/2021 | Balakrishnan | B42D 25/309 |
| 2021/0142334 | A1* | 5/2021 | Webster | G06N 20/00 |
| 2021/0334699 | A1* | 10/2021 | Tabaddor | G06Q 30/018 |
| 2023/0015090 | A1* | 1/2023 | Sharpe | G06N 5/022 |

FOREIGN PATENT DOCUMENTS

| | | |
|---|---|---|
| CN | 107817170 A | 3/2018 |
| CN | 207067095 U | 3/2018 |
| CN | 207528672 U | 6/2018 |
| CN | 106057053 B | 1/2019 |
| CN | 109325541 A | 2/2019 |
| CN | 208526167 U | 2/2019 |
| CN | 110009241 A | 7/2019 |
| CN | 110322769 A | 10/2019 |
| KR | 10-2006-0095671 A | 9/2006 |
| KR | 10-2018-0037987 A | 4/2018 |

OTHER PUBLICATIONS

Verification_validation_and_certification_of_modeling_and_simulation_applications (Year: 2003).*
Automated_knowledge_extraction_from_the_federal_acquisition_regulations_system_FARS (Year: 2017).*
Legal_Requirements_Compliance_and_Practice_An_Industry_Case_Study_in_Accessibility (Year: 2008).*
Automatic evaluation of contractual terms (Year: 2018).*
Integrating Natural Language Processing and Spatial Reasoning for Utility Compliance Checking (Year: 2016).*
Globalization_of_electrical_safety_codes_and_standards (Year: 2002).*
International Application No. PCT/US2020/058633, International Search Report and Written Opinion, mailed Feb. 23, 2021.
Gallo et al., Assessing the reaction to fire of cables by a new bench-scale method, Fire and Materials, vol. 41, Issue 6, Summary only (Dec. 12, 2016).
Khan et al., Screening of plenum cables using a small-scale fire test protocol, Fire and Materials, 36:65-76 (2006).
Nam et al., A new intermediate-scale fire test for evaluating building material flammability, Journal of Fire Protection Engineering, vol. 19, pp. 157-176 (Aug. 2009).

* cited by examiner

TECHNOLOGIES FOR USING MACHINE LEARNING TO DETERMINE PRODUCT CERTIFICATION ELIGIBILITY

CROSS-REFERENCE TO RELATED APPLICATIONS

This application claims priority to U.S. Patent Application No. 62/933,175, filed Nov. 8, 2019, the disclosure of which is hereby incorporated by reference in its entirety.

FIELD

The present disclosure is directed to determining product certification eligibility. More particularly, the present disclosure is directed to platforms and technologies for using machine learning to determine whether a given product is eligible for an applicable product certification.

BACKGROUND

A product that is available for consumer or commercial use or purchase may be subject to certain standards, regulations, or the like based on the applicable jurisdiction, type of use, or other factors, where products may be certified if they comply with the standards or regulations. Accordingly, there may be one or more certifications for which a given product is eligible. When a product is certified, then the product is deemed to have passed certain performance, quality assurance tests, or safety assurance tests, and/or meets qualification criteria stipulated in applicable contracts, regulations, or specifications. Conventionally, to certify a product, an individual associated with an accredited organization must manually review and inspect the product, and/or must subject the product to certain tests, at which point the individual may determine whether the product should be certified.

However, these reviews, inspections, and tests of products are time consuming and costly. Additionally, when new standards are issued or updated, the products subject to the standards may need to be re-tested or otherwise undertake certain steps to determine whether the products are eligible for the certifications. This increases the costs spent on research and development, as well as costs associated with ensuring that products comply with standards. Additionally, this affects certain components of local and global supply chains.

Accordingly, there is an opportunity for entities such as accredited organizations to employ various technologies to more accurately and effectively assess whether products are eligible for certifications, and for entities associated with products to more efficiently and effectively submit product specifications to be considered in determining whether the products are eligible for certification.

SUMMARY

In an embodiment, a computer-implemented method of using machine learning to determine product certification eligibility is provided. The method may include: training, by a computer processor, a set of machine learning models using a set of training data associated with a set of products, the set of training data comprising textual and visual content corresponding to the set of products; storing the set of machine learning models in a memory; accessing, by the computer processor, a specification associated with a product, the specification indicating a set of characteristics for the product and identifying a certification; analyzing, by a computer processor using a machine learning model of the set of machine learning models applicable to the specification, the specification including determining a set of keywords; and based on the analyzing, outputting, by the machine learning model, an indication of whether the product is eligible for the certification.

In another embodiment, a system for using machine learning to determine product certification eligibility is provided. The system may include a transceiver, a memory storing instructions and data associated with a machine learning model, and a processor interfaced with the transceiver and the memory. The processor may be configured to execute the instructions to cause the processor to: train a set of machine learning models using a set of training data associated with a set of products, the set of training data comprising textual and visual content corresponding to the set of products, store the set of machine learning models in the memory, access a specification associated with a product, the specification indicating a set of characteristics for the product and identifying a certification, analyze, using a machine learning model of the set of machine learning models applicable to the specification, the specification including determining a set of keywords, and based on the analyzing, output, by the machine learning model, an indication of whether the product is eligible for the certification.

Further, a non-transitory computer-readable storage medium having stored thereon a set of instructions, executable by a processor, for using machine learning to determine product certification eligibility is provided. The instructions may include: instructions for training a set of machine learning models using a set of training data associated with a set of products, the set of training data comprising textual and visual content corresponding to the set of products; instructions for storing the set of machine learning models in a memory; instructions for accessing a specification associated with a product, the specification indicating a set of characteristics for the product and identifying a certification; instructions for analyzing, using a machine learning model of the set of machine learning models applicable to the specification, the specification including determining a set of keywords; and instructions for, based on the analyzing, outputting, by the machine learning model, an indication of whether the product is eligible for the certification.

BRIEF DESCRIPTION OF THE FIGURES

The figures described below depict various aspects of the system disclosed herein. It should be understood that each figure depicts an embodiment of a particular aspect of the disclosed system, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1A:
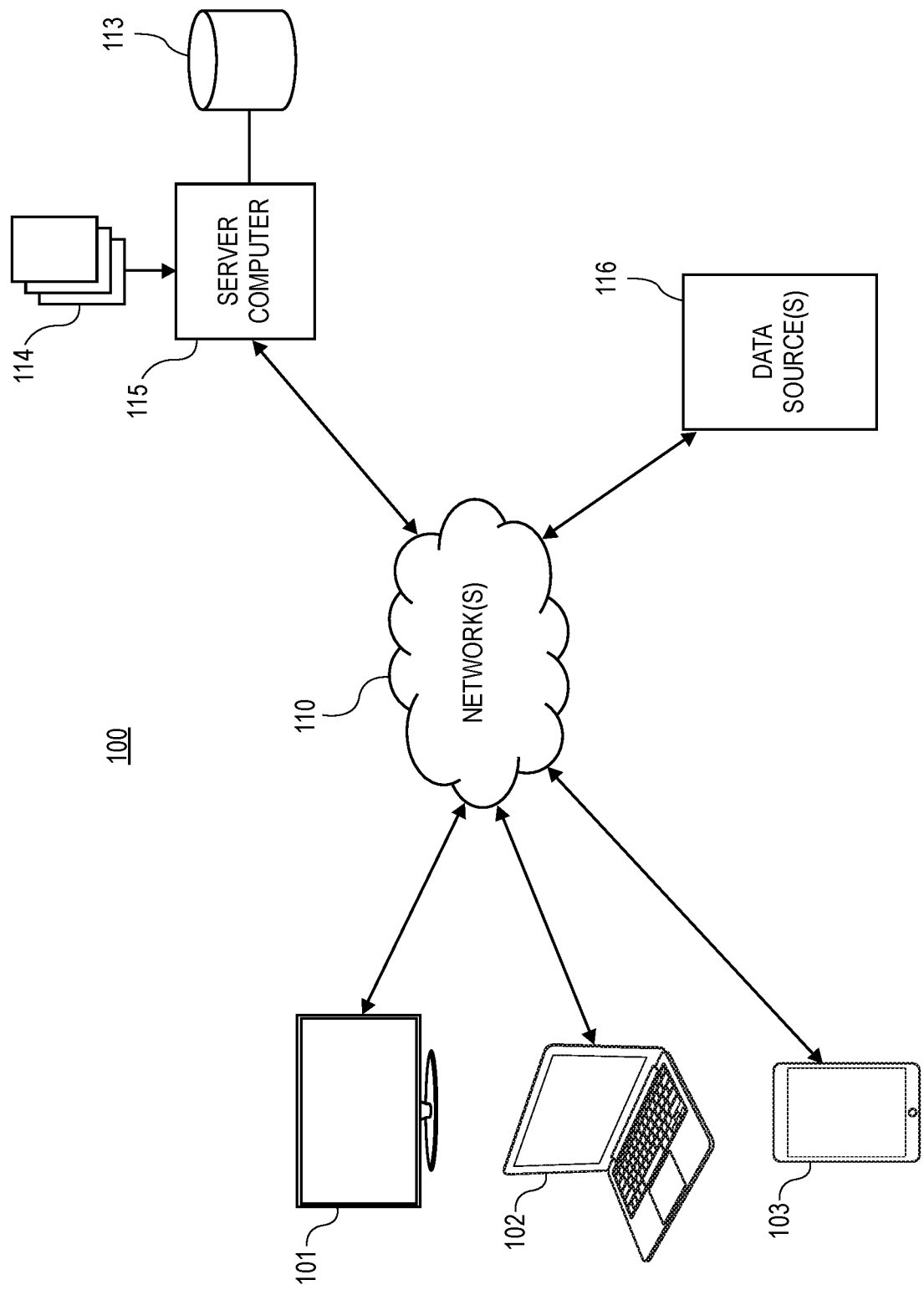
FIG. 1A depicts an overview of components and entities associated with the systems and methods, in accordance with some embodiments.

A product may be certified if it has passed certain performance and/or quality assurance tests, and/or meets qualification criteria stipulated in standards, regulations, specifications, or the like (generally, "standards"). A product certification entity, sometimes referred to as an accreditation body, may be accredited to or aligned with a domestic or international standard for ensuring competence in performing product, process, and service certifications. Certification schemes may be written to include performance test methods that a product must be tested to, as well as a set of criteria that the product must meet to become certified. A product certification entity may certify a given product when the product certification entity demonstrates that the product has been tested to (and complies or meets) an applicable standard(s).

The present embodiments may relate to, inter alia, platforms and technologies for using machine learning to determine whether certain products are eligible for certain certifications. According to certain aspects, systems and methods may train a set of machine learning models that correspond to certain products that are subject to certain standards. An entity associated with a product that is sought to be certified according to a standard (e.g., a manufacturer of the product) may submit a product specification that includes various textual and visual content associated with the product. For example, the specification may be an electronic document (e.g., a PDF document) that includes schematic illustrations of and descriptive content for the product. The systems and methods may extract, from the specification, characteristics associated with the product that are indicated in the specification using various techniques.

The systems and methods may analyze the specification and characteristics extracted therefrom using an appropriate machine learning model, where the appropriate machine learning model may output an indication of whether the product is eligible for the certification. If the systems and methods determine that product is eligible for certification, the systems and methods may facilitate certifying the product, and may generate and transmit an output indicating the same. In contrast, if the systems and methods determine that the product in ineligible for certification or that the specification needs further review, the systems and methods may generate and transmit an output indicating that the product will not be certified, or may forward relevant information to an electronic device to enable further review of the specification.

The systems and methods therefore offer numerous benefits. In particular, entities associated with products may be afforded the benefit of being informed whether a particular product would be eligible for certification, for example during the research and design phase or otherwise prior to the product entering the marketplace, which would reduce costs incurred by the entities. This benefit would also apply in situations in which new product certifications and standards are issued or existing product certifications and standards are updated. Additionally, entities such as safety standard organizations may experience more effective and efficient (and less costly) review of products when determining whether the products are eligible for certification. It should be appreciated that additional benefits are envisioned.

The systems and methods discussed herein address a challenge particular to product certification technologies. The challenge relates to a difficulty in efficiently determining product eligibility for certification according to established standards, as well as the communication of relevant information associated with determining certification eligibility. This is especially apparent when products in later stages of development are not eligible for specific certifications. Conventionally, accredited organizations manually review products and product specifications to determine certification eligibility. The systems and methods offer capabilities to solve these problems by employing training machine learning models corresponding to specific products and specific certifications. Further, the systems and methods analyze product specifications using the trained machine learning models, the outputs of which indicate whether the products associated with the product specifications are eligible for the subject certifications. Further, because the systems and methods employ communication between and among multiple devices and components, the systems and methods are necessarily rooted in computer technology in order to overcome the noted shortcomings that specifically arise in the realm of product certification technologies.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103 may be an electronic device associated with an individual or an entity such as a company, business, corporation, or the like (e.g., a server computer or machine).

The electronic devices 101, 102, 103 may communicate with a server computer 115 via one or more networks 110. In embodiments, the network(s) 110 may support any type of data communication via any standard or technology (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, 4G/5G/6G, Edge, and others). The server computer 115 may be associated with an entity such as a company, business, corporation, or the like, where the entity may be a certification or safety company that may perform safety analyses on various products, create standards for products, certify products according to standards, and/or perform other functions.

The server computer 115 may communicate with one or more data sources 116 via the network(s) 110. In embodiments, each of the data sources 116 may be associated with a merchant, business, corporation, or the like that may compile, generate, or otherwise access data or information associated with products. For example, one of the data sources 116 may be associated with a company that manufactures appliance wiring. According to embodiments, each of the data sources 116 may store data or information indicative and descriptive of certain products as well as standards to which the products may be subject, and applicable geographic locations and jurisdictions associated with the standards, among other information.

The server computer 115 may access, retrieve, or generate training dataset(s) 114, for example from a combination of one or more of the electronic devices 101, 102, 103, one or more of the data sources 116, and/or other data sources. According to embodiments, the set of training datasets 116 may indicate and describe products, including textual and/or visual content describing and/or illustrating the products. Additionally, the data in the set of training datasets 114 may be labeled with certain categories, as will be discussed herein.

The server computer 115 may employ various machine learning techniques, calculations, algorithms, and the like to generate a set of machine learning models using the training dataset(s) 114. In particular, the server computer 115 may initially train a set of machine learning models using the training dataset(s) 114 and then apply or input a validation set into a set of generated machine learning models to determine which of the machine learning models is most accurate or otherwise may be used as the final or selected machine learning model.

According to embodiments, the server computer 115 may input, into the generated machine learning models, a set of input data (which may be a set of real-world product data) associated with one or more products for which certification eligibility may be desired. In embodiments, the set of input data may include textual and/or visual content describing and/or depicting the one or more products. The machine learning model may output a result which may include an indication of whether the product is eligible for a certification, the product is not eligible for the certification, or the set of input needs further review. A user of the electronic devices 101, 102, 103 (e.g., an entity associated with the product) may review the result(s) or output(s) and make decisions and take actions accordingly. In embodiments, a user may access the result(s) or output(s) directly from the server computer 115.

The server computer 115 may be configured to interface with or support a memory or storage 113 capable of storing various data, such as in one or more databases or other forms of storage. According to embodiments, the storage 113 may store data or information associated with the machine learning models that are generated by the server computer 115. Additionally, the server computer 115 may access the data associated with the stored machine learning models to input a set of inputs into the machine learning models.

Although depicted as a single server computer 115 in FIG. 1A, it should be appreciated that the server computer 115 may be in the form of a distributed cluster of computers, servers, machines, cloud-based services, or the like. In this implementation, the entity may utilize the distributed server computer(s) 115 as part of an on-demand cloud computing platform. Accordingly, when the electronic devices 101, 102, 103 and the data source(s) 116 interface with the server computer 115, the electronic devices 101, 102, 103 and the data source(s) may actually interface with one or more of a number of distributed computers, servers, machines, or the like, to facilitate the described functionalities.

Figure 1B:
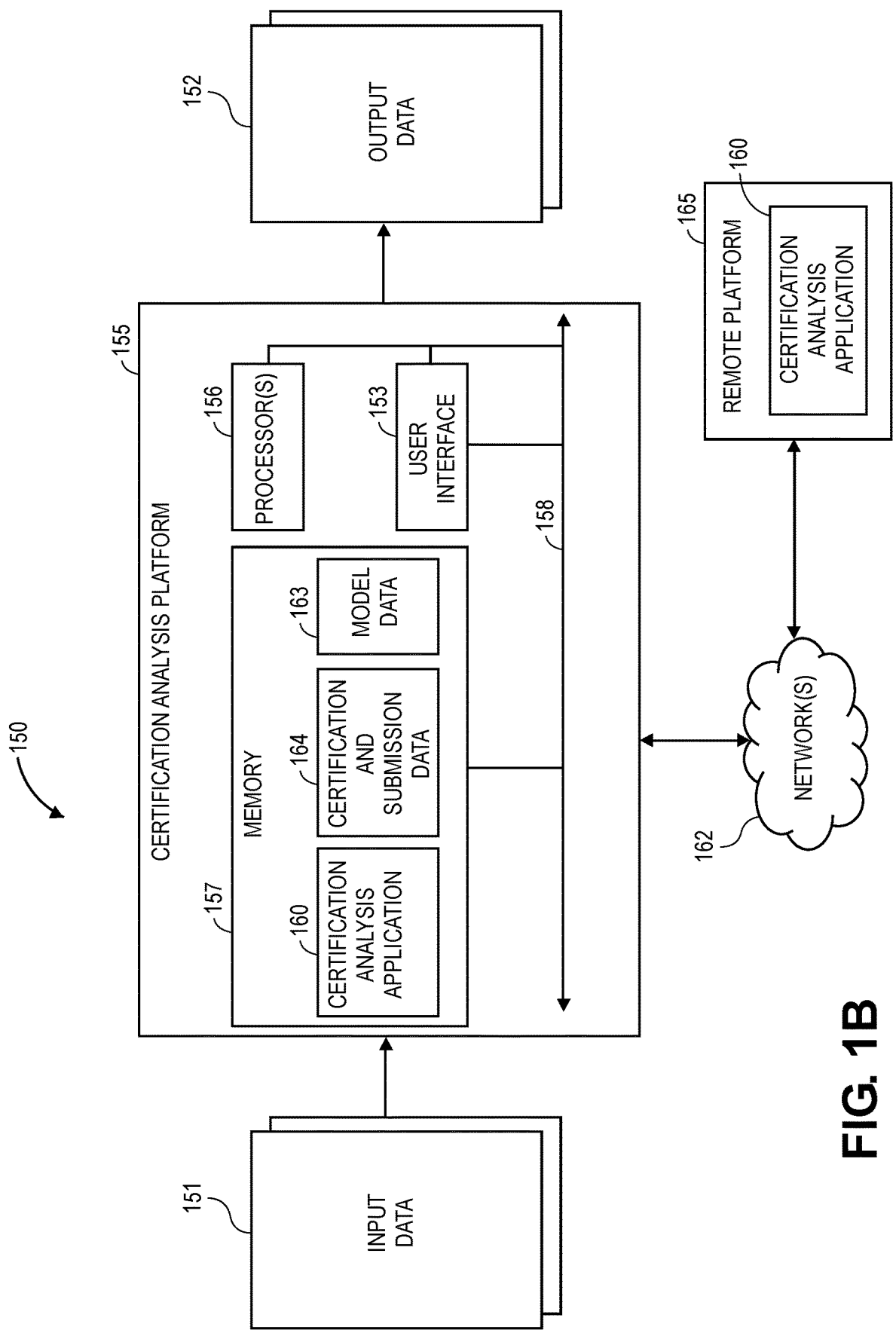
FIG. 1B depicts an overview of certain components configured to facilitate the systems and methods, in accordance with some embodiments.

Although three (3) electronic devices 101, 102, 103, one (1) data source 116, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which a set of input data 151 is processed into output data 152 via a certification analysis platform 155, according to embodiments. In one implementation, the set of input data 151 may be a training dataset. The certification analysis platform 155 may be implemented on any computing device, including the server computer 115 (or in some implementations, one or more of the electronic devices 101, 102, 103) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. The computing device may further include various communication components (e.g., transceivers and ports) that may facilitate data communication with one or more additional computing devices.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The certification analysis platform 155 may further include a user interface 153 configured to present content (e.g., the content of the input data 151 and/or the output data 152, and information associated therewith). Additionally, a user may make selections to the content via the user interface 153, such as to navigate through different information, review certain input data, and/or other actions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a certification analysis application 160), data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The certification analysis platform 155 may operate in a networked environment and communicate with one or more remote platforms, such as a remote platform 165, via a network(s) 162, such as a local area network (LAN), a wide area network (WAN), telecommunications network, or other suitable network. The remote platform 165 may be implemented on any computing device, including one or more of the electronic devices 101, 102, 103 as discussed with respect to FIG. 1A, and may include many or all of the elements described above with respect to the platform 155. In some embodiments, the certification analysis application 160 may be stored and executed by the remote platform 165 instead of by or in addition to the platform 155.

The certification analysis application 160 may employ machine learning techniques such as, for example, a regression analysis (e.g., a logistic regression, linear regression, random forest regression, probit regression, or polynomial regression), classification analysis, k-nearest neighbors, decisions trees, random forests, boosting, neural networks, support vector machines, deep learning, reinforcement learning, Bayesian networks, or the like. When the data 151 is a training dataset, the certification analysis application 160 may analyze/process the data 151 to generate the machine learning model for storage as part of model data 163 that may be stored in the memory 157.

When the data 151 comprises data associated with product specifications to be analyzed using the machine learning model, the certification analysis application 160 may analyze or process the data 151 using the machine learning model to generate the output data 152 that may indicate various outcomes resulting from the analysis using the machine learning model. The memory 157 may be configured to store various certification, standard, and submission data 164 that the certification analysis platform 155 may use to generate machine learning model(s) or may analyze using the machine learning model(s).

The certification analysis application 160 (or another component) may cause the output data 152 (and, in some cases, the training or input data 151) to be displayed on the user interface 153 for review by the user of the certification analysis platform 155. The user may select to review and/or modify the displayed data. For instance, the user may review the output data 152 to assess results of product submissions.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML, R, Stata, AI libraries). In some embodiments, the computer program product may be part of a cloud network of resources.

In some embodiments, the computer program product may be part of a cloud network of resources. Generally, each of the data 151 and the data 152 may be embodied as any type of electronic document, file, template, etc., that may include various textual content, and may be stored in memory as program data in a hard disk drive, magnetic disk and/or optical disk drive in the certification analysis platform 155 and/or the remote platform 165.

Figure 2:
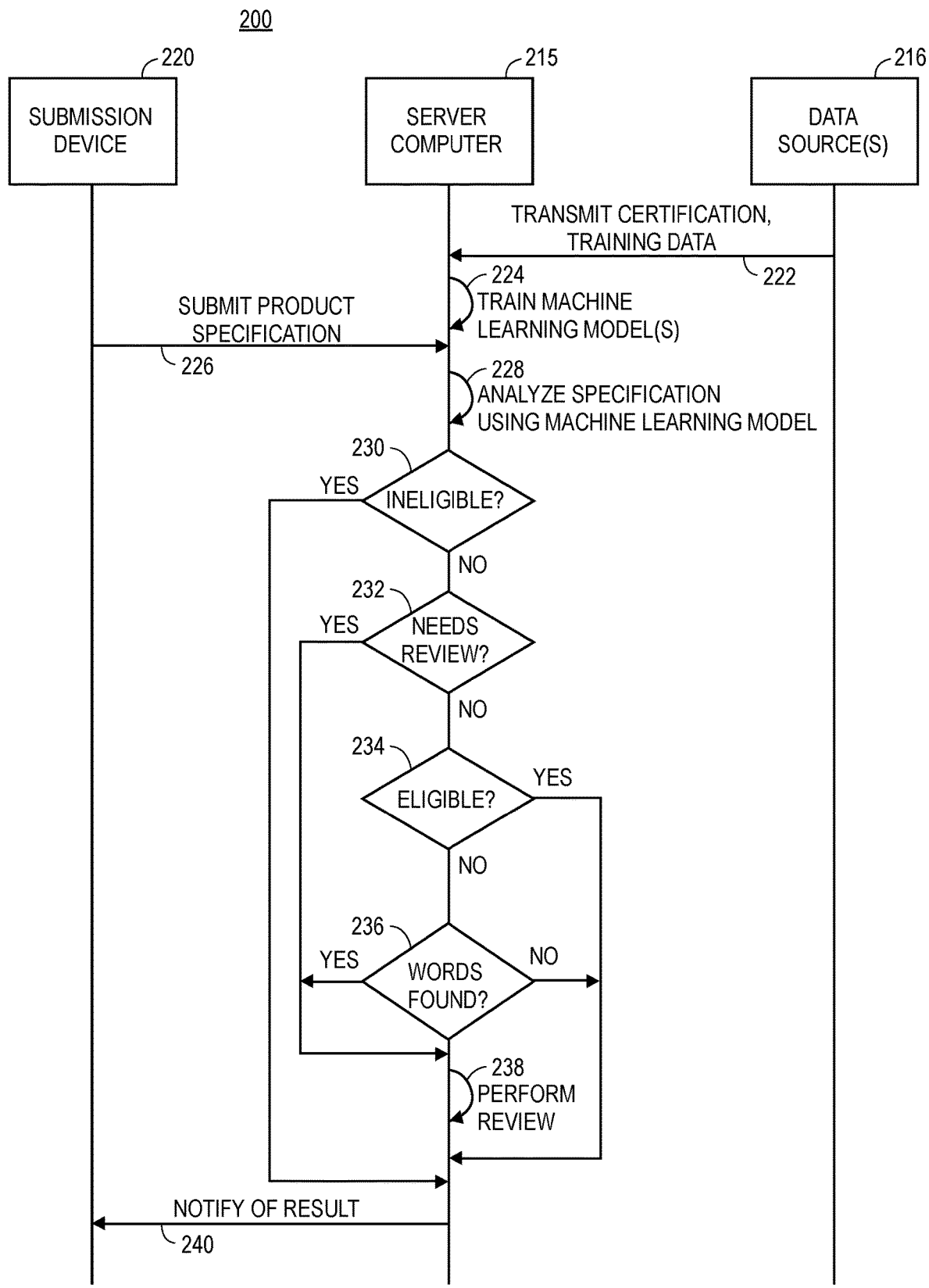
FIG. 2 is an example signal diagram illustrating functionalities associated with using machine learning to determine product certification eligibility, in accordance with some embodiments.

FIG. 2 is a signal diagram 200 depicting various functionalities associated with the systems and methods. The signal diagram 200 includes a submission device 220 associated with an individual or entity (such as one of the electronic devices 101, 102, 103 as discussed with respect to FIG. 1A), a server computer 215 (such as the server computer 115 as discussed with respect to FIG. 1A), and a data source(s) 216 (such as one of the data source(s) 116 as discussed with respect to FIG. 1A).

The signal diagram 200 may begin when the data source(s) 216 transmits, to the server computer 215, a set of training data and product certification/standard data. In embodiments, the set of training data may be associated with a set of products, each of which may be subject to a standard and/or eligible for a certification(s). For each product in the set of products, the set of training data may include textual information or content and/or visual information or content, which in combination may be referred to as a specification for the product. It should be appreciated that the server computer 215 may access at least a portion of the set of training data and product certification data either locally or from one or more other data sources.

In particular, the textual information may include a description of the product including materials, dimensions, construction or assembly, installation, intended use, and/or other similar information. In embodiments, the textual information may include information associated with an applicable standard(s) or certification(s). Because standards and certifications resulting therefrom vary based on geographic locations and/or jurisdictions, the textual data may alternatively or additionally include a geographic location and/or jurisdiction which the server computer 215 may use to identify a standard(s) or certification(s) that may be applicable to the underlying product.

Further, the visual information may include a set of drawings, photographs, images, schematics, plans, blueprints, and/or the like that may visually depict the product. Any item of visual information may also include textual information included therein. For example, a schematic for a product may include dimensions, descriptions, keywords, and/or similar information. It should be appreciated that the set of training data may be embodied in a set of electronic files in one or more formats that may be read by the server computer 215.

Additionally or alternatively, the data transmitted by the data source(s) 216 may include information associated with standards to which the underlying products may be subject. In particular, the data may identify any applicable standards, the language or text of the standards, the applicable geographic locations or jurisdictions for the standards, and/or other information.

The specification for a given product may also include one or more labels indicating whether the product is eligible for a certification. According to embodiments discussed herein, the labels may include "eligible," "ineligible," and "needs review". For example, a schematic drawing for a razor may include the label "eligible." It should be appreciated that alternative and additional labels are envisioned, and that the labels may be revised, added to, or reduced. It should be appreciated that different information or documents included in a given specification for a product may have different labels. For example, a first schematic drawing for a LED lamp may include the label "eligible," and a second schematic drawing for the same LED lamp may include the label "ineligible."

The server computer 215 may train (224) a set of machine learning models using the set of training data and product standard/certification data. In embodiments, the server computer 215 may train different machine learning models that correspond to different products that are eligible for different certifications. For example, the server computer 215 may train a first machine learning model for an LED lamp that is eligible for a first certification in the United States, and may train a second machine learning model for the same LED lamp that is eligible for a second certification in Europe. It should be appreciated that the server computer 215 may use various types of techniques, algorithms, calculations, or the like to train the set of machine learning models (for example, regression analysis (e.g., a logistic regression, linear regression, random forest regression, probit regression, or polynomial regression), classification analysis, k-nearest neighbors, decisions trees, random forests, boosting, neural networks, support vector machines, deep learning, reinforcement learning, Bayesian networks, or the like).

In addition to training the set of machine learning models, the server computer 215 may additionally access (e.g., from the data source(s) 216), generate, or compile listings of keywords associated with the products having associated machine learning models, where each machine learning model may have an associated listing. According to embodiments, each listing may include keywords of various categories. For example, the categories may be "eligible," "ineligible," or "needs review," where there may be zero, one, or more keywords for each category. It should be appreciated that the listings of keywords may be compiled manually, such as by a safety standard organization, or may be generated automatically, such as by the server computer 215. In particular, the server computer 215 may, using the training data for a given product and certification, automatically generate the listing of keywords and categories thereof.

According to embodiments, an entity associated with the submission device 220 may wish to determine whether a specific product complies with or is eligible for a certain certification associated with a standard to which the specific product may be subject in the marketplace. Accordingly, the submission device 220 may submit (226) a product specification to the server computer 215, where the product specification may be associated with the specific product. In embodiments, the submission device 220 may enable a user to input information associated with the product specification via a form, questionnaire, upload, or other form of submission.

The product specification may include or identify various information associated with the product including, for example, an identification and description of the product, a set of drawings or schematics (generally, visual content) depicting the product, a geographical location(s) and/or jurisdiction(s) corresponding to an envisioned market for the product, and/or other information. At least a portion of the information (e.g., the geographical location(s) and/or jurisdiction(s)) may be embodied as metadata, for example as captured via an entry on the submission device 220.

The server computer 215 may analyze (228) the specification using a machine learning model that is applicable to the product. The server computer 215 may initially identify which machine learning model of the set of trained machine learning model is applicable to the product. In particular, the applicable machine learning model may align to the identification of the product as well as the applicable geographic location or jurisdiction as specified in the product specification. For example, if the product specification identifies appliance wiring for a certain appliance with a jurisdiction of Great Britain, the server computer 215 may identify the machine learning model corresponding to appliance wiring of that appliance with a jurisdiction of Great Britain.

In analyzing the specification using the applicable machine learning model, the server computer 215 may perform one or more analyses. In particular, the server computer 215 may perform an optical character recognition (OCR) analysis on the information included in the specification to identify a set of words, phrases, and/or terms that may be included in the information. It should be appreciated that the server computer 215 may perform the OCR on any textual or visual content included in the information.

Additionally or alternatively, the server computer 215 may perform a visual analysis technique on any visual content included in the information to determine or identify terms, keywords, dimensions, materials, or other aspects associated with the product depicted in the visual content. For example, in performing the visual analysis technique on a schematic depicting the appliance wiring, the server computer 215 may determine the components, materials, and length of the appliance wiring. It should be appreciated that the server computer 215 may employ various image analysis and OCR techniques, calculations, algorithms, or the like, when analyzing the information.

Generally, in conjunction with the server computer 215 analyzing the specification using the machine learning model, a set of keywords associated with the product specification may result. Further, the server computer 215 may access a listing of keywords associated with the certification and may compare the determined set of keywords to the listing of keywords, where the comparison may be performed in successive steps.

Initially, the server computer 215 may determine (230) whether there are any ineligible keywords included in the determined set of keywords. In particular, the server computer 215 may determine whether any of the determined set of keywords matches any keyword(s) having the category "ineligible" as specified in the listing of keywords associated with the certification. For example, one of the ineligible keywords for the certification associated with the appliance wiring may be "extra." It should be appreciated that the determination may be in the affirmative (i.e., "yes") if any (i.e., one or more) of the determined keywords are ineligible, or if a certain threshold amount (e.g., at least five (5)) of the determined keywords are ineligible. If the server computer 215 determines that there are one or more ineligible keywords ("YES"), the server computer 215 may deem that the product as described and depicted in the specification is ineligible for certification and processing may proceed to (240), or to other functionality.

If the server computer 215 determines that there are not any ineligible keywords (or if the amount of ineligible keywords does not meet or exceed a threshold amount) ("NO"), the server computer may determine (232) whether the specification needs review. In particular, the server computer 215 may determine whether any of the determined set of keywords are "trigger" keywords as specified in a corresponding "trigger" listing category. For example, one of the trigger keywords for the certification associated with the appliance wiring may be "harness." It should be appreciated that the determination may be in the affirmative (i.e., "yes") if any (i.e., one or more) of the determined keywords are trigger keywords, or if a certain threshold amount (e.g., at least five (5)) of the determined keywords are trigger keywords. If the server computer 215 determines that there are one or more trigger keywords ("YES"), the server computer 215 may deem that the product as described and depicted in the specification needs further review and processing may proceed to (238), or to other functionality.

If the server computer 215 determines that there are not any trigger keywords (or if the amount of trigger keywords does not meet or exceed a threshold amount) ("NO"), the server computer may determine (234) whether the product is eligible for certification. In particular, the server computer 215 may determine whether any of the determined set of keywords are "eligible" keywords as specified in a corresponding "eligible" listing category. For example, one of the eligible keywords for the certification associated with the appliance wiring may be "ground." It should be appreciated that the determination may be in the affirmative (i.e., "yes") if any (i.e., one or more) of the determined keywords are eligible keywords, or if a certain threshold amount (e.g., at least five (5)) of the determined keywords are eligible keywords. If the server computer 215 determines that there are one or more eligible keywords ("YES"), the server computer 215 may deem that the product as described and depicted in the specification is eligible for certification and processing may proceed to (240), or to other functionality.

If the server computer 215 determines that there are not any eligible keywords (or if the amount of eligible keywords does not meet or exceed a threshold amount) ("NO"), the server computer may determine (236) whether there are any keywords included in the determined set of keywords (i.e., whether the determined set of keywords is a null set). If the server computer 215 determines that there are keywords found ("YES"), processing may proceed to (238), or to other functionality. If the server computer 215 determines that there are no keywords found ("NO"), processing may proceed to (240), or to other functionality.

At (238), the server computer 215 may perform a review of the product specification. In some embodiments, the server computer 215 may automatically and without user intervention perform the review in an attempt to reconcile or clarify any detected trigger words, and/or determine a reason for a lack of eligible keywords. In other embodiments, a user may access the server computer 215 to review the product specification, and optionally determine whether the product is eligible for certification. Based on the review, the server computer 215 may determine whether the product is eligible or ineligible for the certification.

At (240), the server computer 215 may notify the submission device 220 of the result of the analysis. In particular, the server computer 215 may generate a notification or other type of electronic communication that indicates that the result of the eligibility determination functionalities performed in (230), (232), (234), and (236), and transmit the notification to the submission device 220. It should be appreciated that the server computer 215 may facilitate various functionalities that may result in the product being certified (e.g., communicating with a safety standard organization).

Additionally, if a product is deemed ineligible for certification, the server computer 215 may determine, from the analysis, a set of changes that may need to be applied to or implemented in the product that would result in the product being eligible for certification. In this scenario, the server computer 215 may communicate with a manufacturer or other entity associated with the product, indicating the set of changes that may need to be made.

Figure 3:
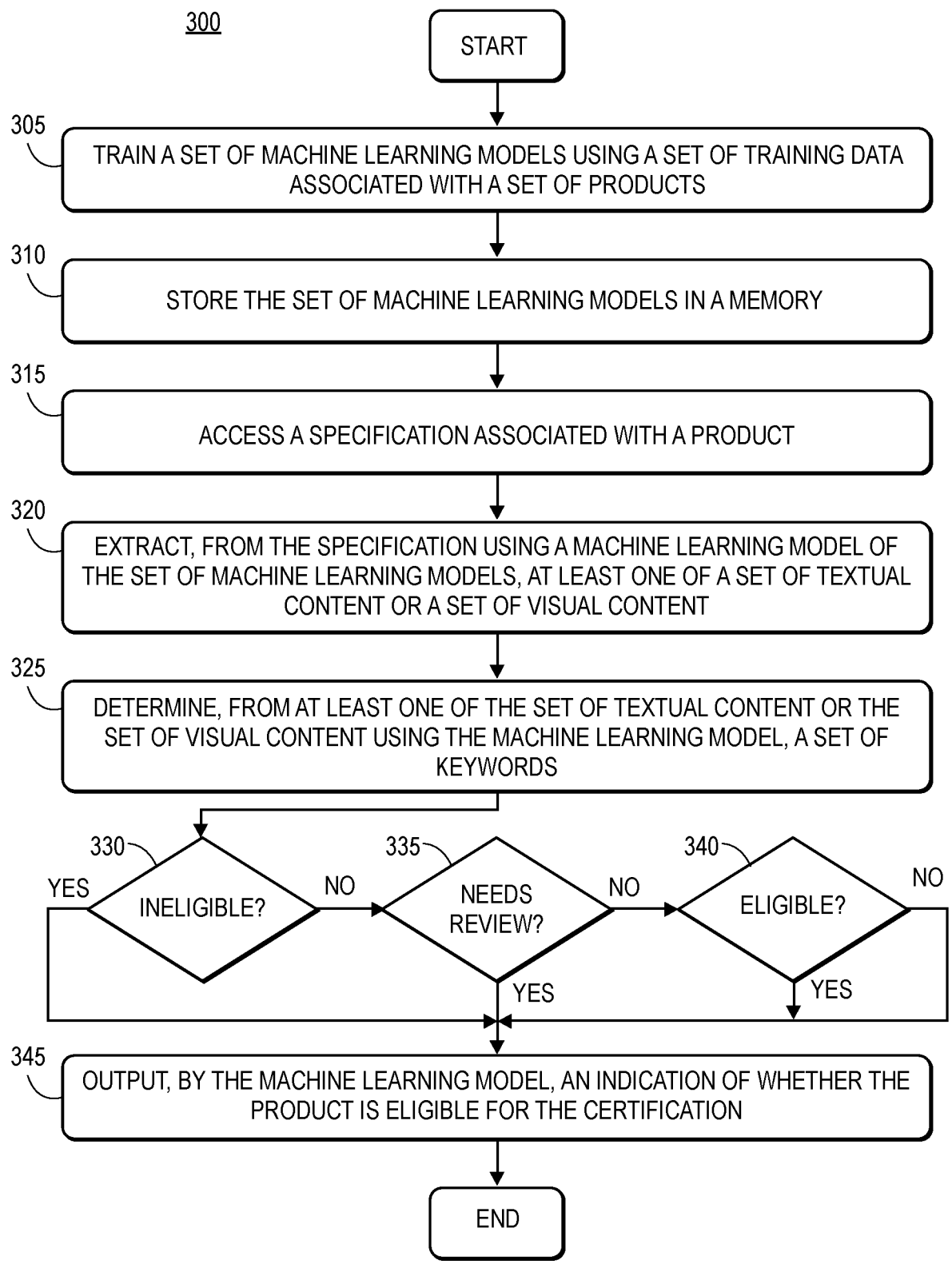
FIG. 3 is an example flowchart associated with using machine learning to determine product certification eligibility, in accordance with some embodiments.

FIG. 3 depicts a block diagram of an example method 300 of using machine learning to determine product certification eligibility. The method 300 may be facilitated by an electronic device (such as the server computer 115 or components associated with the certification analysis platform 155 as discussed with respect to FIG. 1B) that may be in communication with additional devices and/or data sources.

The method 300 may begin when the electronic device trains (block 305) a set of machine learning models using a set of training data associated with a set of products. In embodiments, the set of training data may comprise textual and visual content corresponding to set of products. The set of training data may further account for a set of certifications for which the set of products may be eligible. The electronic device may store (block 310) the set of machine learning models in a memory, where the set of machine learning models corresponds to the set of products as well as the set of certifications.

The electronic device may access (block 315) a specification associated with a product, where the specification may indicate a set of characteristics for the product, and where the product is eligible for a certification. According to embodiments, the specification may indicate a geographic area or jurisdiction, and the electronic device may access a machine learning model of the set of machine learning models that is applicable to the product and to the geographical area or jurisdiction.

The electronic device may extract (block 320), from the specification using a machine learning model of the set of machine learning models, at least one of a set of textual content or a set of visual content. Further, the electronic device may determine (block 325), from at least one of the set of textual content or the set of visual content using the machine learning model, a set of keywords. In embodiments, the electronic device may perform, using the machine learning model, an OCR technique on the set of textual content to determine the set of keywords and/or may perform a visual analysis technique on the set of visual content to determine the set of keywords.

The electronic device may access a listing of keywords associated with the certification, where the listing of keywords may indicate various categories for the keywords (e.g., "ineligible," "needs review" or "trigger," and "eligible"). Further, the electronic device may determine (block 330) whether there are any ineligible keywords included in the determined set of keywords. In embodiments, the determination may be affirmative (i.e., "YES") if there is at least one or at least a threshold amount of ineligible keywords included in the determined set of keywords.

If the electronic device determines that there are ineligible keywords ("YES"), processing may proceed to block 345. If the electronic device determines that are not ineligible keywords ("NO"), the electronic device may determine (block 335) if the specification needs further review for the product to be eligible for the certification. In particular, the specification may need further review if at least one keyword in the set of keywords is a trigger keyword for the certification. If the electronic device determines that the specification needs further review ("YES"), processing may proceed to block 345.

If the electronic device determines that the specification does not need further review ("NO"), the electronic device may determine (block 340) if the product is eligible for the certification. In particular, the electronic device may determine that the product is eligible for certification if the set of keywords (i) does not include any ineligible keywords or trigger keywords, and (ii) includes at least one eligible keyword. Regardless of the outcome of block 340 ("YES" or "NO"), processing may proceed to block 345.

At block 345, the electronic device may output, by the machine learning model, an indication of whether the product is eligible for the certification. In particular, based on the determinations of blocks 330, 335, and 340, the electronic device may output an indication that the product is ineligible for certification or eligible for certification, or that the specification needs further review for the product to be eligible for certification. In embodiments, the electronic device may facilitate the review of the specification.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of using machine learning to determine product certification eligibility, the method comprising:
   training, by a computer processor, a plurality of machine learning models using a set of training data associated with a set of appliances, the set of training data comprising (i) textual and visual content corresponding to the set of appliances, wherein the visual content comprises, for each appliance of the set of appliances, a training schematic drawing depicting appliance wiring of that appliance, and wherein the training schematic drawing comprises a label for a category of a plurality of categories;
   storing the plurality of machine learning models in a memory;
   accessing, by the computer processor, a specification (i) comprising a schematic depicting an appliance wiring of an appliance, (ii) identifying a certification, and (iii) indicating a geographic area or jurisdiction corresponding to an envisioned market for the appliance, wherein the certification is applicable to the geographic area or jurisdiction;
   performing, by the computer processor, a visual analysis technique on the schematic to determine a set of components, a set of materials, and a length for the appliance wiring;
   identifying, by the computer processor, a machine learning model of the plurality of machine learning models that corresponds to (i) the appliance, and (ii) the geographic area or jurisdiction corresponding to the envisioned market for the appliance;
   analyzing, by the computer processor using the machine learning model, the specification, including the set of components, the set of materials, and the length for the appliance wiring to:
      determine a set of keywords associated with the appliance, wherein each keyword of the set of keywords has a type that is one of an ineligible keyword, a trigger keyword, or an eligible keyword, and
      output an indication that the appliance is ineligible for the certification, wherein the indication is based at least on the type of each keyword of the set of keywords;
   determining a set of changes that need to be implemented in the appliance that would result in the appliance being eligible for the certification;
   automatically performing, by the computer processor without user intervention, a review to reconcile or clarify any of the set of keywords being the trigger keyword type; and
   determining, by the computer processor, a reason when none of the set of keywords is the eligible keyword type.

2. The computer-implemented method of claim 1, further comprising:
   determining that at least one keyword in the set of keywords is the ineligible keyword type.

3. A system for using machine learning to determine product certification eligibility, comprising:
   a transceiver;
   a memory storing instructions and data associated with a machine learning model; and
   a processor interfaced with the transceiver and the memory, and configured to execute the instructions to cause the processor to:
      train a plurality of machine learning models using a set of training data associated with a set of appliances, the set of training data comprising (i) textual and visual content corresponding to the set of appliances, wherein the visual content comprises, for each appliance of the set of appliances, a training schematic drawing depicting appliance wiring of that appliance, and wherein the training schematic drawing comprises a label for a category of a plurality of categories,
      store the plurality of machine learning models in the memory,
      access a specification (i) comprising a schematic depicting an appliance wiring of an appliance, (ii) identifying a certification, and (iii) indicating a geographic area or jurisdiction corresponding to an envisioned market for the appliance, wherein the certification is applicable to the geographic area or jurisdiction,
      perform a visual analysis technique on the schematic to determine a set of components, a set of materials, and a length for the appliance wiring,
      identify a machine learning model of the plurality of machine learning models that corresponds to (i) the appliance, and (ii) the geographic area or jurisdiction corresponding to the envisioned market for the appliance,
      analyze, using the machine learning model, the specification, including the set of components, the set of materials, and the length for the appliance wiring to:
         determine a set of keywords associated with the appliance, wherein each keyword of the set of keywords has a type that is one of an ineligible keyword, a trigger keyword, or an eligible keyword, and output, by the machine learning model, an indication that the appliance wiring is ineligible for the certification, wherein the indication is based at least on the type of each keyword of the set of keywords, determine a set of changes that need to be implemented in the appliance that would result in the appliance wiring being eligible for the certification, automatically perform, without user intervention, a review to reconcile or clarify any of the set of keywords being the trigger keyword type, and determine a reason when none of the set of keywords is the eligible keyword type.

4. The system of claim 3, wherein the processor is further configured to:

determine that at least one keyword in the set of keywords is the ineligible keyword type.

5. A non-transitory computer-readable storage medium having stored thereon a set of instructions, executable by a processor, for using machine learning to determine product certification eligibility, the instructions comprising:

instructions for training a plurality of machine learning models using a set of training data associated with a set of appliances, the set of training data comprising (i) textual and visual content corresponding to the set of appliances, wherein the visual content comprises, for each appliance of the set of appliances, a training schematic drawing depicting appliance wiring of that appliance, and wherein the training schematic drawing comprises a label for a category of a plurality of categories;

instructions for storing the plurality of machine learning models in a memory;

instructions for accessing a specification (i) comprising a schematic depicting an appliance wiring of an appliance, (ii) identifying a certification, and (iii) indicating a geographic area or jurisdiction corresponding to an envisioned market for the appliance, wherein the certification is applicable to the geographic area or jurisdiction;

instructions for performing a visual analysis technique on the schematic to determine a set of components, a set of materials, and a length for the appliance wiring;

instructions for identifying a machine learning model of the plurality of machine learning models that corresponds to (i) the appliance, and (ii) the geographic area or jurisdiction corresponding to the envisioned market for the appliance;

instructions for analyzing, using the machine learning model, the specification, including the set of components, the set of materials, and the length for the appliance wiring to:

determine set of keywords associated with the appliance, wherein each keyword of the set of keywords has a type that is one of an ineligible keyword, a trigger keyword, or an eligible keyword, and output an indication that the appliance is ineligible for the certification, wherein the indication is based at least on the type of each keyword of the set of keywords;

instructions for determining a set of changes that need to be implemented in the appliance that would result in the appliance being eligible for the certification;

instructions for automatically performing, without user intervention, a review to reconcile or clarify any of the set of keywords being the trigger keyword type; and instructions for determining a reason when none of the set of keywords is the eligible keyword type.

* * * * *